(No Model.)
E. S. RAYBURN & C. A. BELL.
HAND TRUCK.
No. 490,043. Patented Jan. 17, 1893.
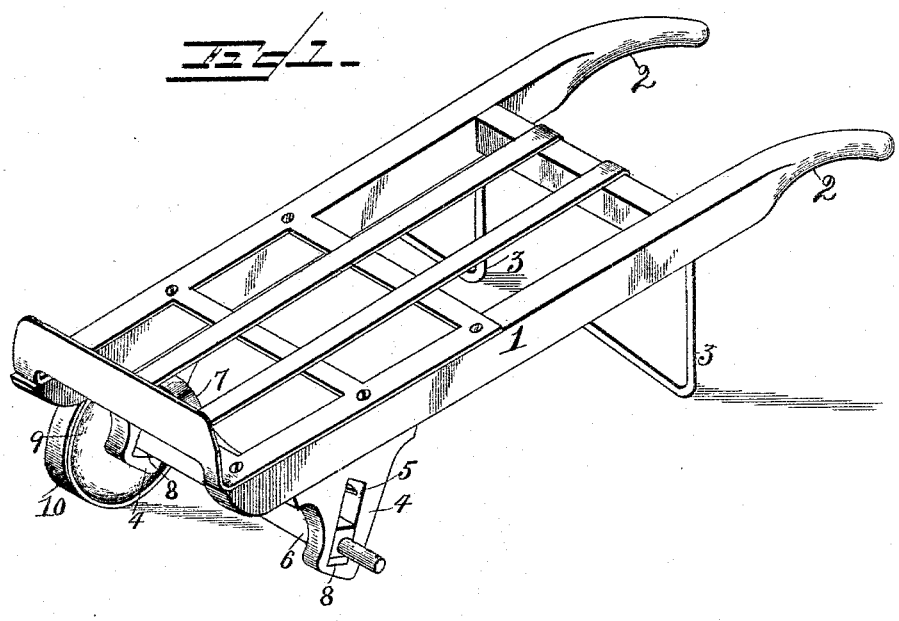
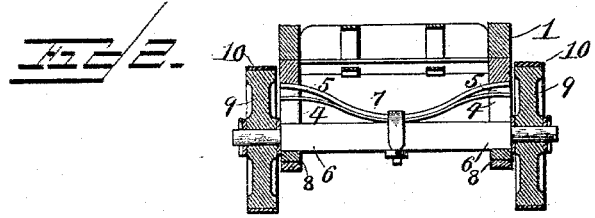
Witnesses
W. E. Schneider
Inventors
E. S. Rayburn.
C. A. Bell.
By their Attorneys,
C. A. Snow & Co.

UNITED STATES PATENT OFFICE.

EDDY S. RAYBURN AND CHARLEY A. BELL, OF SAN JOSÉ, CALIFORNIA.

HAND-TRUCK.

SPECIFICATION forming part of Letters Patent No. 490,043, dated January 17, 1893.

Application filed June 30, 1892. Serial No. 438,574. (No model.)

*To all whom it may concern:*

Be it known that we, EDDY S. RAYBURN and CHARLEY A. BELL, citizens of the United States, residing at San José, in the county of Santa Clara and State of California, have invented a new and useful Hand-Truck, of which the following is a specification.

The invention relates to improvements in hand trucks.

The object of the present invention is to provide a simple and inexpensive hand truck in which the frame will be cushioned to prevent jars being communicated to the user and also for the purpose of preventing injury to freight.

The invention consists in the construction and novel combination and arrangement of parts hereinafter fully described, illustrated in the accompanying drawings and pointed out in the claims hereto appended.

In the drawings—Figure 1 is a perspective view of a hand truck constructed in accordance with this invention, one of the wheels being removed. Fig. 2 is a transverse sectional view.

Like numerals of reference indicate corresponding parts in both the figures of the drawings.

1 designates a rectangular truck frame having in its rear end handles 2 and provided near the latter with supporting legs 3 and having near its front end depending bearing castings 4 arranged at opposite sides of the frame at a forward inclination when the frame is in a horizontal position to bring the bearing bracket into a perpendicular position when the frame of the hand truck is in an inclined position during use. The bearing brackets 4 are provided with inclined slots 5 in which are arranged the ends of an axle 6, and which are adapted to permit a limited vertical movement of the axle when the truck is in use.

The hand truck is cushioned to prevent injury to freight, such as fruit and the like, and also to prevent the jars incident to its use being communicated to the user, by a leaf spring 7, which is centrally clipped to the upper face of the axle, and which has its ends arranged in the elongated opening of the bearing bracket, whereby the frame will be cushioned against shocks. The leaf spring is composed of leaves having their ends separated so that when only a light load is being carried the same will be supported by the upper leaf; and when a heavier load is placed upon the truck it will be supported by both the leaves if the load is heavy enough to force the upper leaf down upon the lower one. This construction obviates the necessity of employing separate springs for the different character of loads to be handled; and it will be seen that any number of leaves may be employed so as to adapt the hand truck to different weights and to obviate the necessity of employing separate hand trucks, some having light springs and some heavier ones.

The axle which may be of any configuration rests upon elastic blocks 8, which are preferably constructed of india rubber, and which are arranged at the lower ends of the elongated openings; and the wheels 9 are provided with suitable rubber tires 10.

It will be seen that the truck is simple and inexpensive in construction; that it is cushioned against shocks to prevent injury to freight and also to prevent jars being communicated to the user, and that the tension of the cushioning spring is automatically adjusted to the weight of the load.

What we claim is—

1. In a hand truck, the combination of a frame, depending bearing castings secured to the frame and provided with elongated openings, an axle arranged in the opening, and a spring centrally secured to the axle and having its ends bearing against the tops of the openings, substantially as described.

2. In a hand truck, the combination of a frame, castings depending therefrom and provided with inclined elongated openings, an axle arranged in the openings, and a cushioning spring interposed between the axle and the tops of the openings, substantially as described.

3. In a hand truck, the combination of a frame, depending bearing castings having elongated openings, an axle arranged in the openings and a spring centrally clipped to the axle and composed of separate leaves having their ends separated and arranged within the elongated openings and interposed between the axle and the tops of the openings, substantially as described.

4. In a hand truck, the combination of a frame, bearing castings depending from the same and provided with inclined elongated openings, elastic blocks arranged in the openings at the bottom thereof, an axle arranged in the openings and bearing upon the elastic blocks, and a spring centrally clipped to the axle and having its ends arranged in the openings, and interposed between the tops of the same and the axle, substantially as described.

In testimony that we claim the foregoing as our own we have hereto affixed our signatures in the presence of two witnesses.

EDDY S. RAYBURN.
CHARLEY A. BELL.

Witnesses:
C. M. WOOSTER,
G. W. RAYBURN.